United States Patent [19]

Münker et al.

[11] Patent Number: 4,982,617
[45] Date of Patent: Jan. 8, 1991

[54] GEARSHIFT SYSTEM

[76] Inventors: Friedrich Münker, Am Freibad 15, D-5910 Kreuztal 9; Axel Barten, Im Gensterfeld 20, D-5900 Siegen-Sohlbach, both of Fed. Rep. of Germany

[21] Appl. No.: 298,941

[22] Filed: Jan. 19, 1989

[30] Foreign Application Priority Data

Feb. 24, 1988 [DE] Fed. Rep. of Germany ....... 3805710

[51] Int. Cl.$^5$ .................. F16H 3/08; F16D 19/00; F16D 23/00
[52] U.S. Cl. ........................... 74/333; 74/364; 192/88 B
[58] Field of Search .............. 74/364, 333, 421 R, 74/370; 192/88 B, 74, 56 F

[56] References Cited

U.S. PATENT DOCUMENTS

| | | | |
|---|---|---|---|
| 2,093,281 | 9/1937 | Kreuser | 192/88 B |
| 3,648,812 | 3/1972 | Kost | 192/88 B |
| 4,552,257 | 11/1985 | Witt | 192/88 B X |
| 4,885,957 | 12/1989 | Taung et al. | 192/88 B X |

FOREIGN PATENT DOCUMENTS

217309 12/1924 United Kingdom .................. 74/370

*Primary Examiner*—Leslie A. Braun
*Assistant Examiner*—Ichoi Q. Ta
*Attorney, Agent, or Firm*—Young & Thompson

[57] ABSTRACT

Transmission

In conventional transmissions utilized, for example, in rolling mill facilities, the shifting procedure is cumbersome and time-consuming. The shifting process is to be simplified in the novel transmission.

The multiple-speed, e.g. two-speed transmisssion (1) exhibits two pinions (2, 3) rotatably supported on a motor-driven input shaft (5), of shifting speeds I and II, for driving two gear wheels (6, 7) non-rotationally arranged on an output shaft. The pinions (2, 3) can be coupled selectively with the input shaft (5) by means of the hydraulic clamping sleeves (10) of two friction clutches (8, 9).

The transmission is especially suited for use in rolling mill drive mechanisms.

3 Claims, 1 Drawing Sheet

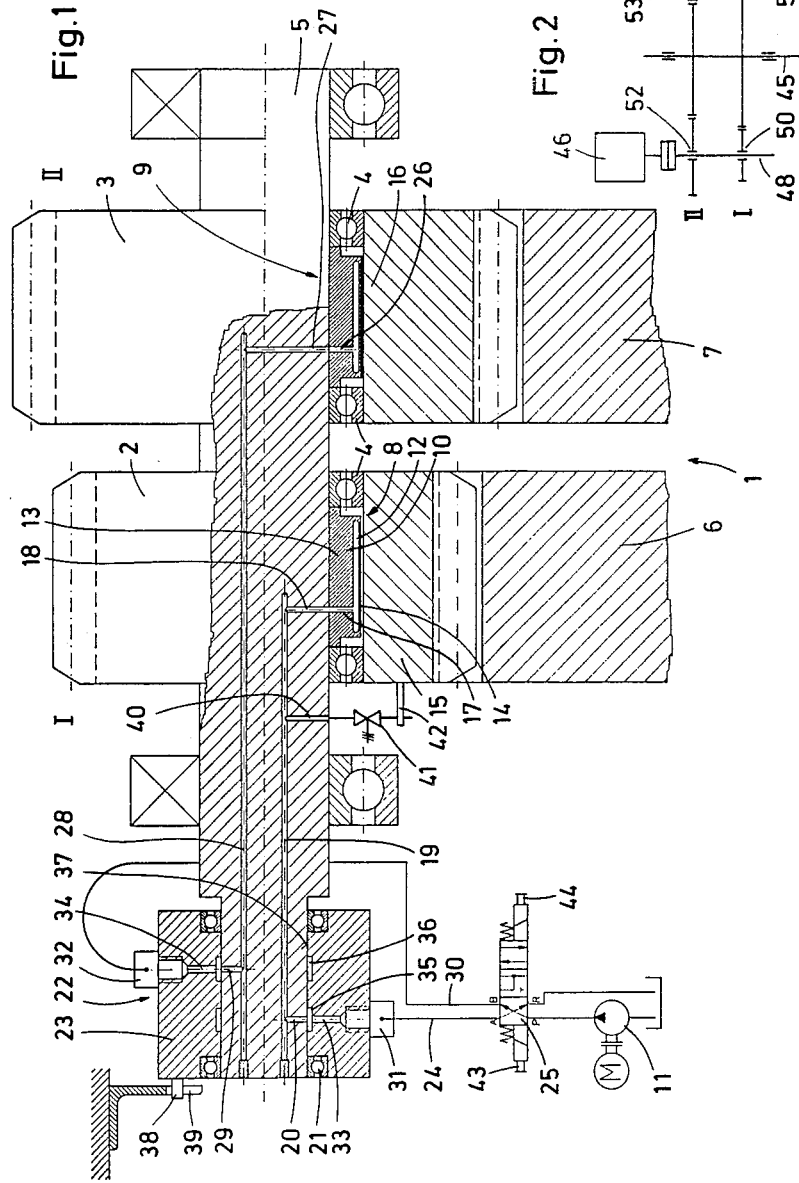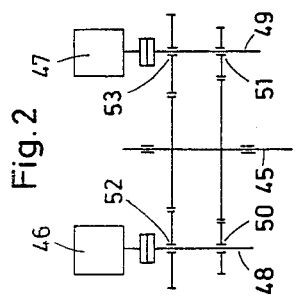

GEARSHIFT SYSTEM

The invention relates to a gearshift system in accordance with the preamble of claim 1.

Two-speed transmissions are utilized in rolling mill engineering, for example for the drive mechanisms of the work rolls and coilers of an aluminum thin-gage strip rolling mill; these transmissions have heretofore been shifted mechanically in order to drive the rolls and correspondingly also the coilers in dependence on the required rolling moment at a lower or higher number of revolutions. Such a two-speed transmission exhibits a shifting sleeve with external tooth system, this sleeve being arranged nonrotationally on the input shaft and to be displaceable in the axial direction. Upon standstill of the input shaft, this shifting sleeve can be engaged by means of a hydraulic servo drive mechanism selectively into a ring gear with internal teeth at the pinion of the pair of gear wheels of the first or second speed. This shifting procedure has turned out to be cumbersome and time-consuming in the predominantly prevailing shifting position wherein upon engagement of the shifting sleeve the teeth of the latter are not entirely in confrontation with the corresponding tooth gaps of the internal teeth of the ring gear on the pinion of the pair of gear wheels to be brought into engagement. In this case, the shifting sleeve is moved back to a central position by the hydraulic servo drive mechanism, and the input shaft with the shifting sleeve is once more set into rotation by the drive motor. Thereafter, the input shaft is arrested by cutting off the motor, and the shifting sleeve is again shifted toward the pinion of the transmission stage to be engaged. In case the shifting sleeve and the pinion once more fail to arrive at the engagement position, the shifting process must be repeated until the sleeve can be engaged into the ring gear on the pinion.

It has been found under practical conditions that the hydraulic servo drive mechanism of the shifting sleeve must be locked in the engaged position of the sleeve since otherwise there is the danger that the shifting sleeve is disengaged on account of micro movements of the gear wheels in meshing engagement. Such a locking action, however, does not provide the desirable high degree of operating safety, either, since the possibility cannot be excluded that due to the micro movements of the gear wheels such a high pressure is exerted on the shifting sleeve that the linkage of the servo drive mechanism is bent out of shape, and the shifting sleeve is thereby disengaged.

The invention is based on the object of simplifying the shifting process in a transmission of the type under consideration herein.

This object has been attained according to the invention by a multiple-speed transmission having the features described hereinafter.

Suitable embodiments of the invention constitute the subject matter of the dependent claims.

The transmission according to this invention is distinguished over the conventional gearshift system by a substantially simplified and faster shifting procedure, as well as smaller space requirement which, for example in the rolling mill construction field, is of considerable importance. Such reduced space requirement results from the feature that the friction clutches, designed as hydraulic clamping sleeves, for coupling the drive pinions of the individual shifting speeds with the input shaft are, within the longitudinal sections of the input shaft occupied by the pinions, either placed onto the input shaft or installed within the input shaft.

Additional features and advantages of the invention can be seen from the subsequent description of an embodiment illustrated schematically in the drawing wherein:

FIG. 1 is a longitudinal section through a two-speed transmission and

FIG. 2 is a two-speed transmission driven by two parallel-connected motors.

The two-speed transmission 1 illustrated in FIG. 1, with speeds I and II, comprises two pinions 2, 3 rotatably supported by means of respectively two ball bearings 4 on a motor-driven input shaft 5 and selectively driving the gear wheels 6 and 7 nonrotationally arranged on an output shaft, not shown. The drive pinions 2, 3 of the threaded stages I, II can be coupled by way of friction clutches 8, 9 selectively to the input shaft 5.

The friction clutches 8, 9 consist of a double-walled clamping sleeve 10 with a jacket space 12 that can be connected to an oil pump 11, with an inner part 13 fixedly disposed on the input shaft 5 between the ball bearings 4 of the drive pinions 2, 3, and with an outer jacket 14 radially expansible by the oil pressure in the jacket space 12 for the frictional clamping connection of the input shaft 5 with the hubs 15, 16 of the drive pinions 2, 3.

The jacket space 12 of the clamping sleeve 10 of the friction clutch 8 of transmission speed I is connected to the oil pump 11 by way of a radial duct 17 in the inner part 13, a radial duct 18 coaxial with respect to duct 17, an axial duct 19, and a further radial duct 20 in the input shaft 5, by way of the rotationally secured hydraulic block 23 of a rotary entering guide 22, which block is supported on the free end of the input shaft 5 via ball bearings 21, by way of a connecting conduit 24, and by way of a 4/2-way valve 25.

The jacket space 12 of the clamping sleeve 10 of the friction clutch 9 pertaining to transmission speed II is in communication with the oil pump 11 by way of a radial duct 26 in the inner part 13, a radial duct 27 coaxial to duct 26, an axial duct 28, and a further radial duct 29 in the input shaft 5, by way of the hydraulic block 23, a connecting conduit 30, and the 4/2-way valve 25.

The hydraulic block 23 exhibits two radial connections 31, 32 for the connecting conduits 24, 30 to the oil pump 11. The connections 31, 32 are connected, by way of respectively one radial duct 33, 34 in the hydraulic block 23 and an annular duct 35, 36 in the bearing bore 37 of the block, with the feed ducts 20, 19, 18 in the input shaft 5 to the clamping sleeve 10 of tranmission stage I and, respectively, with the feed ducts 29, 28, 27 to the clamping sleeve 10 of the transmission stage II.

The hydraulic block 23 supported on the input shaft 5 is secured against twisting by means of a stop pin 38 mounted on the end face and cooperating with a counter stop 39 on the transmission base, not illustrated.

The transmission 1 can be equipped for both speeds with an overload safety means. The overload safety means for speed I comprises a safety valve 41 arranged on the input shaft 5 and in communication with the axial feed duct 19 to the hydraulic clamping sleeve 10 of the friction clutch 8 by way of a radial duct 40, and a stop 42, arranged at the hub 15 of the drive pinion 2, for opening the safety valve 41 in case of a relative rotation between the input shaft 5 and the pinion 2 upon the occurrence of an overload.

The overload safety means of speed II, not illustrated, is designed in the same way.

Speed I of the two-speed transmission 1 is engaged by operating the switch 43 of the 4/2-way valve 25, and speed II is engaged by operating the switch 44 of valve 25.

In a modification of the aforedescribed embodiment, the transmission can be equipped, for example, with three shifting speeds. Furthermore, it is possible to insert the clamping sleeves 10 of the friction clutches 8, 9 in the input shaft 5.

The aforedescribed transmission concept is suitable, in particular, for multiple-speed gearshift systems, for example a two-speed transmission of the type shown in FIG. 2 with a torque-divided drive of an output shaft 45 by two parallel-connected motors 46, 47 and two input shafts 48, 49. The two friction clutches 50, 51 of speed I and the clutches 52, 53 of speed II can in each case be engaged simultaneously.

We claim:

1. Multiple-speed transmission for rolling mill drive mechanisms, with at least two pinions of two shifting stages, rotatably supported on a motor-driven input shaft and being selectively connectible with this input shaft, for driving gear wheels non-rotationally arranged on an output shaft, characterized by selectively engageable friction clutches (8, 9) for coupling the drive pinions (2, 3) with the input shaft (5), wherein the friction clutches (8, 9) exhibit a double-walled clamping sleeve (10) with a jacket space (12) that can be connected to a pressure medium source, and with an outer jacket (14) radially expansible by the pressure medium in the jacket space (12) for frictionally clamping input shaft (5) and pinion or gear wheel hub (15, 16), and wherein the clamping sleeves (10) of the friction clutches (8, 9) are fixedly arranged on the input shaft (5) with their inner part (13) between multiple rotary bearings (4) of the drive pinions (2, 3), the clamping sleeves (10) of the friction clutches (8, 9) being connected to an oil pump (11) by way of feed ducts (17-19; 27-29) in the input shaft (5), by way of a rotationally secured hydraulic block (23), supported on the input shaft (5) by rotational bearings (21), of a rotational entering guide (22), by way of connecting conduits (24; 30) and a multiple-way valve (25).

2. Transmission according to claim 1, wherein the hydraulic block (23) exhibits two radial connections (31, 32) for the connecting conduits (24, 30) to the oil pump (11) which (31, 32) are connected, via respectively one radial duct (33, 34) in the hydraulic block (23) and an annular duct (35, 36) in a bearing bore (37) of the block (23) with the feed ducts (20, 19, 18) in the input shaft (5) to the clamping sleeve (10) of a first transmission stage I and, respectively, with the feed ducts (29, 28, 27) in the input shaft (5) to the clamping sleeve (10) of a second transmission stage II.

3. Multiple-speed transmission for rolling mill drive mechanisms, with at least two pinions of two shifting stages, rotatably supported on a motor-driven input shaft and being selectively connectible with this input shaft, for driving gear wheels non-rotationally arranged on an output shaft, characterized by selectively engageable friction clutches (8, 9) for coupling the drive pinions (2, 3) with the input shaft (5), wherein the friction clutches (8, 9) exhibit a double-walled clamping sleeve (10) with a jacket space (12) that can be connected to a pressure medium source, and with an outer jacket (14) radially expansible by the pressure medium in the jacket space (12) for frictionally clamping input shaft (5) and pinion or gear wheel hub (15, 16), and wherein the clamping sleeves (10) of the friction clutches (8, 9) are fixedly arranged on the input shaft (5) with their inner part (13) between multiple rotary bearings (4) of the drive pinions (2, 3), further comprising an overload safety means with a safety valve (41) arranged on the input shaft (5) and being in communication with the feed duct (19) of the clamping sleeve (10) of a friction clutch (8), and with a stop (42) arranged at the hub (15) of the associated pinion (2) for opening the safety valve (41) in case of a relative rotation between the input shaft (5) and the pinion (2) upon the occurrence of an overload.

* * * * *